United States Patent [19]

Krieger et al.

[11] Patent Number: 4,667,293

[45] Date of Patent: May 19, 1987

[54] ELECTRONIC ITEM SELECTION APPARATUS AND METHOD

[75] Inventors: Charles F. Krieger, Danville; Wilbur L. Schultz, Kensington; Robert L. Kong, San Francisco, all of Calif.

[73] Assignee: Computer Election Systems, Berkeley, Calif.

[21] Appl. No.: 644,872

[22] Filed: Aug. 27, 1984

[51] Int. Cl.[4] ........................ G06F 15/20; G06G 7/48; G09G 3/02

[52] U.S. Cl. .................................... 364/409; 340/712; 235/472

[58] Field of Search ........................ 340/707, 708, 712; 235/472; 364/409

[56] References Cited

U.S. PATENT DOCUMENTS

| | | | |
|---|---|---|---|
| 3,947,669 | 3/1976 | Simmons et al. | 364/409 |
| 4,190,833 | 2/1980 | Bejting et al. | 340/712 X |
| 4,303,916 | 12/1981 | Hakaridani et al. | 304/712 |

FOREIGN PATENT DOCUMENTS

| | | | |
|---|---|---|---|
| 34759 | 3/1980 | Japan | 340/712 |

*Primary Examiner*—E. A. Goldberg
*Assistant Examiner*—Patrick W. Foster
*Attorney, Agent, or Firm*—Flehr, Hohbach, Test, Albritton & Herbert

[57] ABSTRACT

A method and apparatus for selecting one of a multiplicity of preidentified items, such as candidates on an election ballot. Each item has an associated light emitting element which has an on/off status. The use of the lights is time multiplexed between status display and item selection tasks. For at least a first certain portion of each of a plurality of successive time cycles, the lights with an on status are energized. The lights which are energized are associated with previously selected items. They are energized to a level of illumination visible to the human eye in a normal ambient light environment.

For a second portion of each time cycle, a multiplicity of the lights are energized in a prearranged time dependent algorithmic pattern. During this portion of the time cycle the lights are energized only to a level of illumination not normally visible to the human eye in a normal ambient light environment.

Items are selected by positioning a light detection element sufficiently close to the item's associated light to receive the light emitted therefrom during at least one of the second portions of the time cycles.

The identity of the item selected is determined by correlating the time when light is received by the light detection element with the prearranged time dependent pattern.

31 Claims, 9 Drawing Figures

ELECTRONIC ITEM SELECTION APPARATUS AND METHOD

The present invention relates generally to an apparatus and method for selecting one of a multiplicity of preidentified items, such as might be used in a voting machine or a testing system.

The prior art includes a wide variety of voting machines and other menu oriented data input devices. Prior art voting machines include so called "lever machines"; machines using punch card ballots which are then tallied using electronic machinery; and several "electronic" models which generally incorporate electro-mechanical switches next to each item (e.g., a candidate's name or yes/no boxes next to a referendum or proposition) plus a light which provides visual confirmation that a particular item has been selected.

Prior art menu oriented data input devices are obviously too numerous to review in any detail. But insofar as the general format of the hardware is concerned, the prior art includes touch sensitive cathode ray tubes; LCD (liquid crystal display) displays with electro-mechanical switches along the perimeter; and cathode ray tubes (CRTs) with a mouse, light pen or similar mechanism for selecting a item on the CRT screen.

An item selection apparatus and method suitable for use in voting machines and other item selection systems should have several characteristics. The hardware should be simple (i.e., inexpensive), reliable and easy to use by persons of all backgrounds. It should be adaptable to various ballot presentation schemes, including both multiple page schemes and single palette schemes. Further, it should provide visual confirmation of the voter's selections and should provide an easy to use method of correcting or changing vote selections. Also, it should provide an easy to use mechanism for "write in candidates", i.e., the selection (or entry) of items not provided in the prearranged ballot or menu. Finally, it should be capable of providing suitable electronic signals for the tallying of votes by a microprocessor or other data processing device.

The present invention is superior to devices using electro-mechanical switches next to each item in addition to a light, because the invention eliminates the need for such electro-mechanical switches. This simplifies the system, reducing its expense and improving its reliability. The present invention is also superior to CRT based devices because the invention allows for the display of a full ballot on a single palette, but a full ballot will not usually fit in a single frame on the CRT's screen. Several jurisdictions, including New York State have laws which make the use of a single page ballot a practical necessity.

It is therefore, a primary object of the invention to provide an improved item selection apparatus and method.

Another object of the invention is to provide an improved item selection apparatus and method suitable for use in voting machines which meets the above described criteria.

It is also an object of the invention to provide an improved item selection apparatus and method which is very inexpensive to use and which is suitable for many data entry applications in addition to voting.

SUMMARY OF THE INVENTION

In summary, the invention is a method and apparatus for selecting one of a multiplicity of preidentified items, such as candidates on an election ballot. Each item has an associated light emitting element which has an on/-off status. That is, there is a light next to each item and each light appears to be either on or off. Usually, a light has an on status and appears to be lit only if the item next to the light has been previously selected.

Each light is used "simultaneously" for two separate purposes. Insofar as can be seen by the human eye, the lights are either on or off in accordance with their status. But during time periods not normally visible to the human eye the lights are "scanned" in such a manner that if a light pen is placed next to one of the lights the light pen apparatus can determine which light is being selected by the user of the light pen. Scanning involves briefly "energizing", i.e., turning on, the lights. During scanning the lights are turned on so briefly that the eye cannot see it, but the light pen can. A light pen is a device for detecting light.

Thus items are selected by "pointing" a light pen at a light next to item; i.e., by placing the light pen sufficiently close to the light so as to receive the light eminating from it. In a preferred embodiment, after an item is selected it can be de-selected by pointing the pen at the item's light a second time.

The invention takes advantage of the well documented persistence of the human eye. The human eye generally does not notice the flickering of a light if the flicker rate is in excess of about 30 times per second. Thus if a light is on only about 5% of the time but the flicker rate is hundreds of times per second then the light will appear to be on all the time to the human eye. The type of fast flickering used in the preferred embodiment is well beyond the sensitivity of the human eye.

During the time when the lights are not being energized (i.e., turned on) in accordance with their status the invention scans through the lights. In other words, it turns them on and off them in some prearranged order. But the lights are energized only a very small percentage of the time by the scanning process. For example, in the preferred embodiment the scan causes each light to be energized less than 0.02% of the time. Importantly, this scanning is not visible to the human eye because the lights are energized such a small percentage of the time. Even though the lights which have an off status are very briefly energized during scanning, the lights appear to the human eye to be off.

The invention determines the identity of the item selected by correlating the time when light is received by the light pen with the scan pattern.

Electronically, the use of the lights is time multiplexed between status display and item selection tasks. For at least a first certain portion of each of a plurality of successive time cycles, the lights with an on status are energized. The lights which are energized are associated with previously selected items. They are energized to a level of illumination visible to the human eye in a normal ambient light environment.

For a second portion of each time cycle, a multiplicity of the lights are energized in a prearranged time dependent algorithmic pattern. During this portion of the time cycle the lights are energized only to a level of illumination not normally visible to the human eye in a normal ambient light environment.

Items are selected by positioning a light detection element sufficiently close to the item's associated light to receive the light emitted therefrom during at least one of the second portions of the time cycles.

The identity of the item selected is determined by correlating the time when light is received by the light detection element with the prearranged time dependent pattern.

Additional objects and features of the invention will be more readily apparent from the following detailed description and appended claims when taken in conjunction with the drawings, in which:

Figure 3:
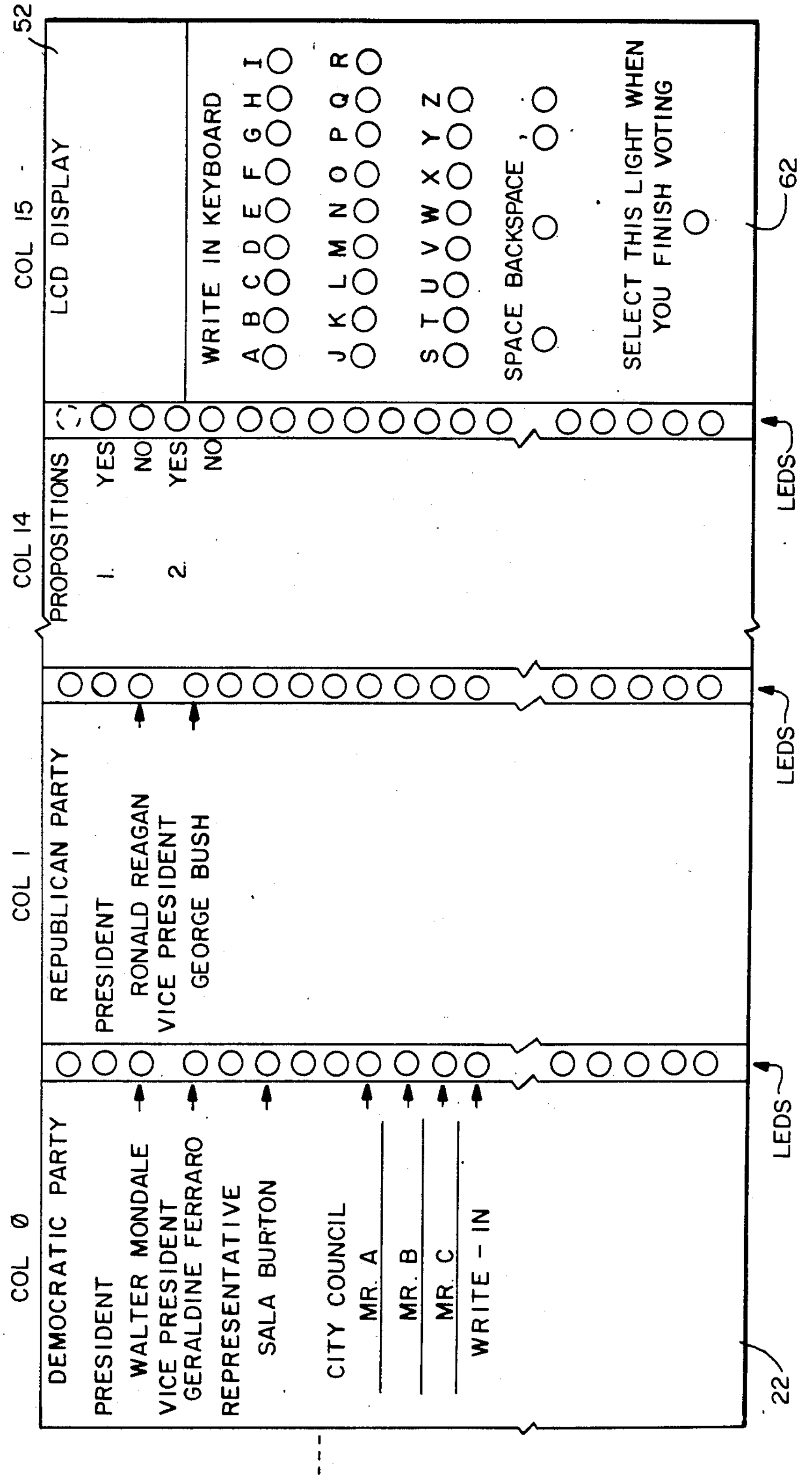
Figure 4A:
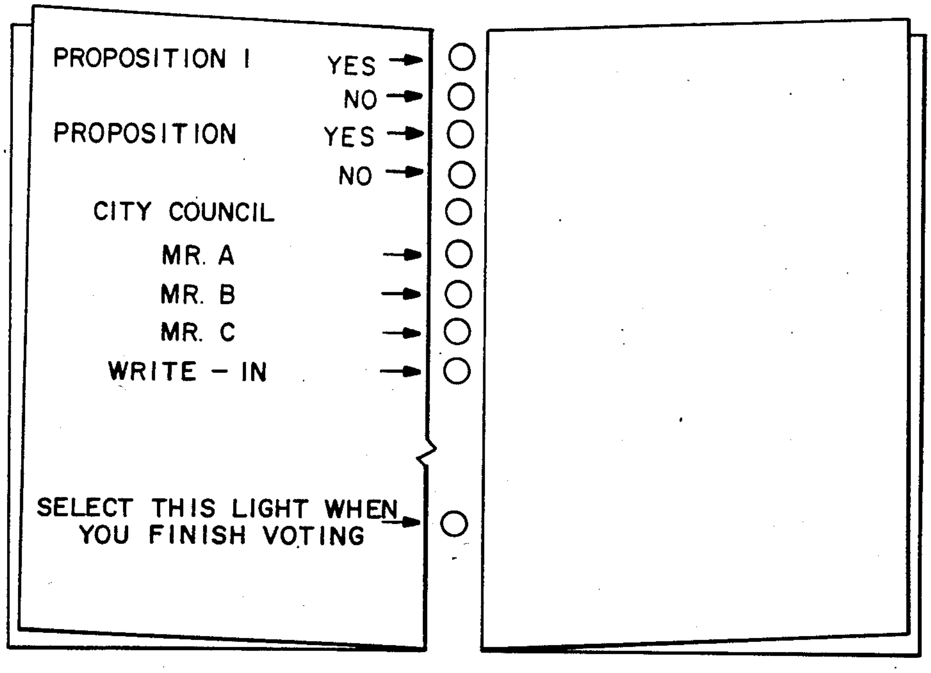
Figure 4B:
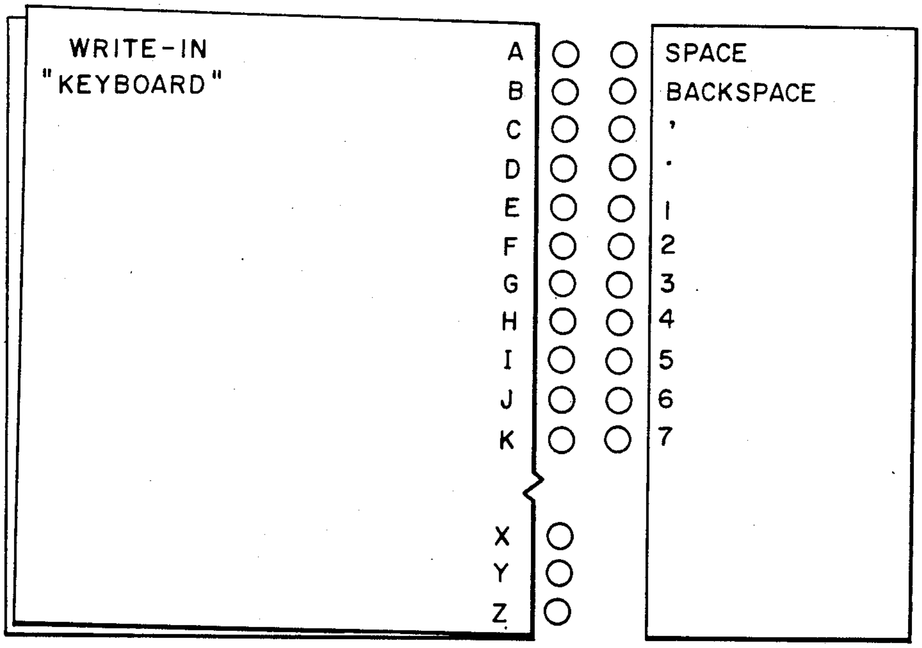

FIGS. 3 and 4*a*–*b* depict two types of voting ballots which can be used in conjunction with the invention.

Figure 5:
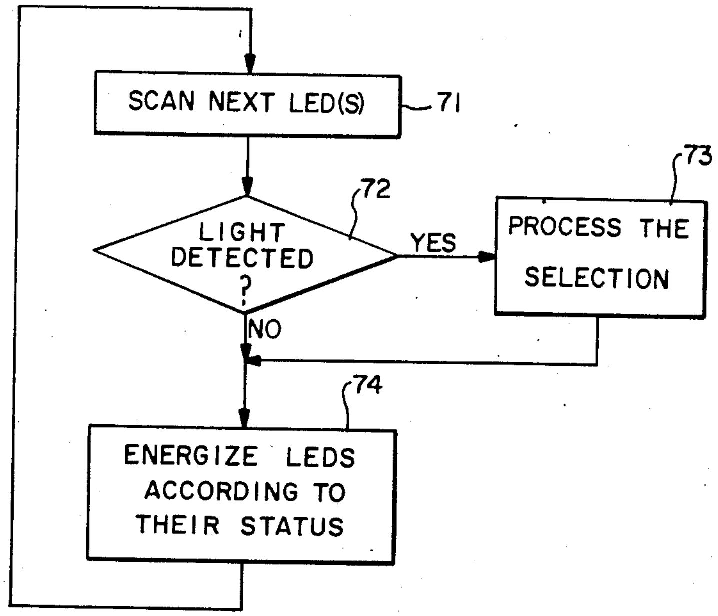

FIG. 5 depicts a flow chart of the invention.

Figure 6:
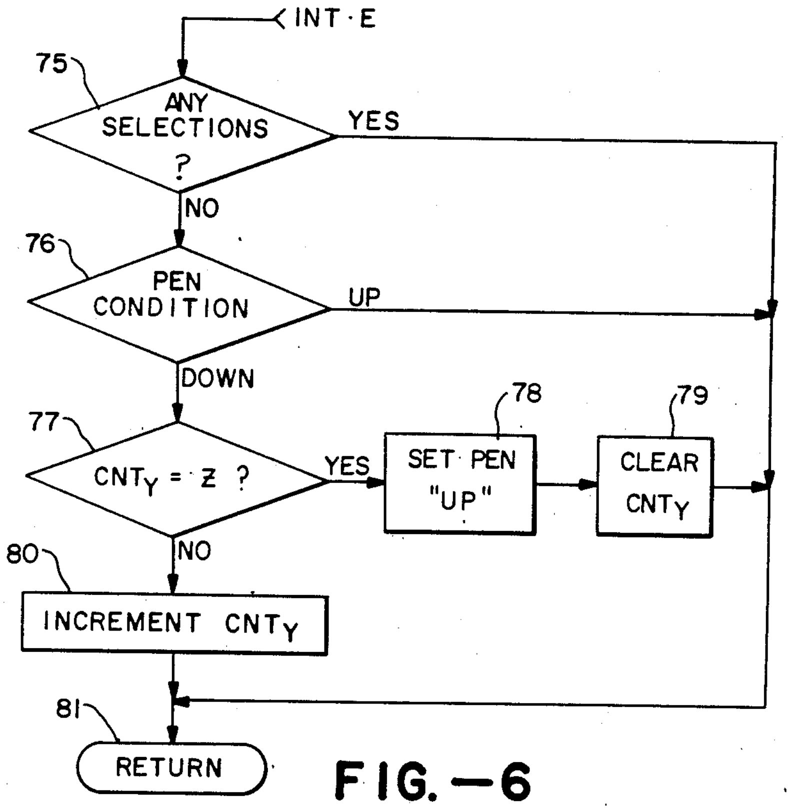
Figure 7:
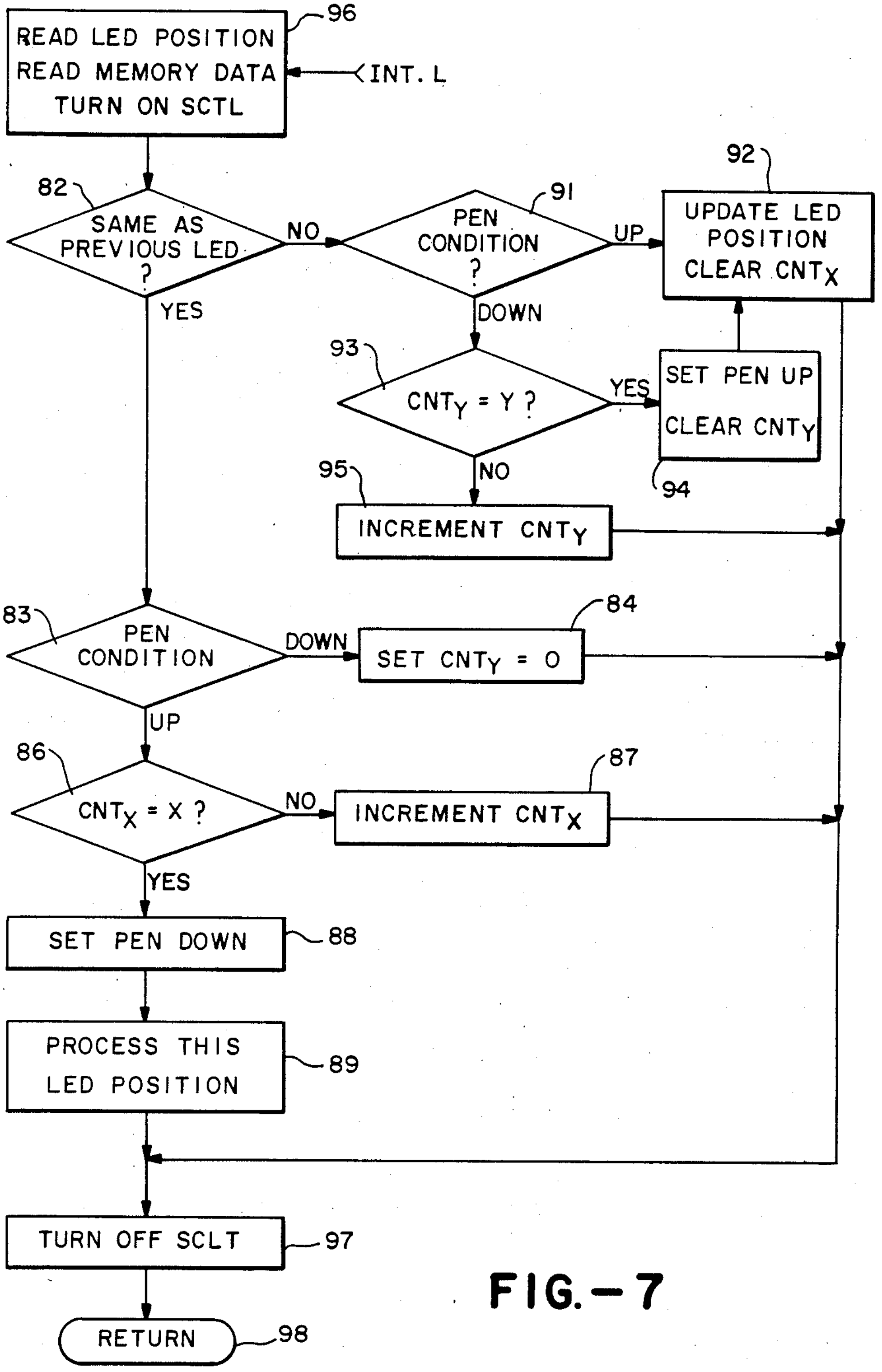

FIGS. 6 and 7 depict flow charts of two portions of the method of a preferred embodiment of the invention.

Figure 8:
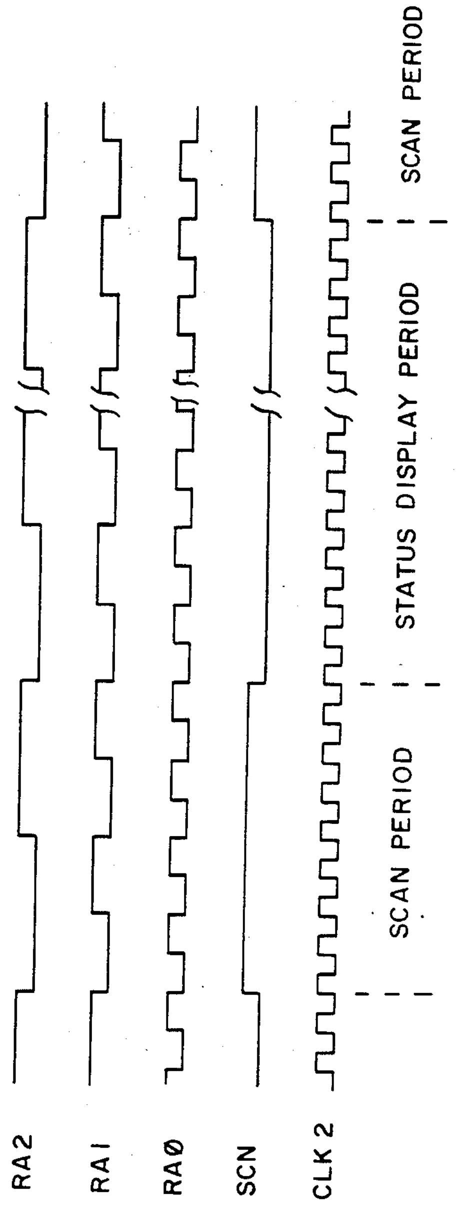
Figure 2:
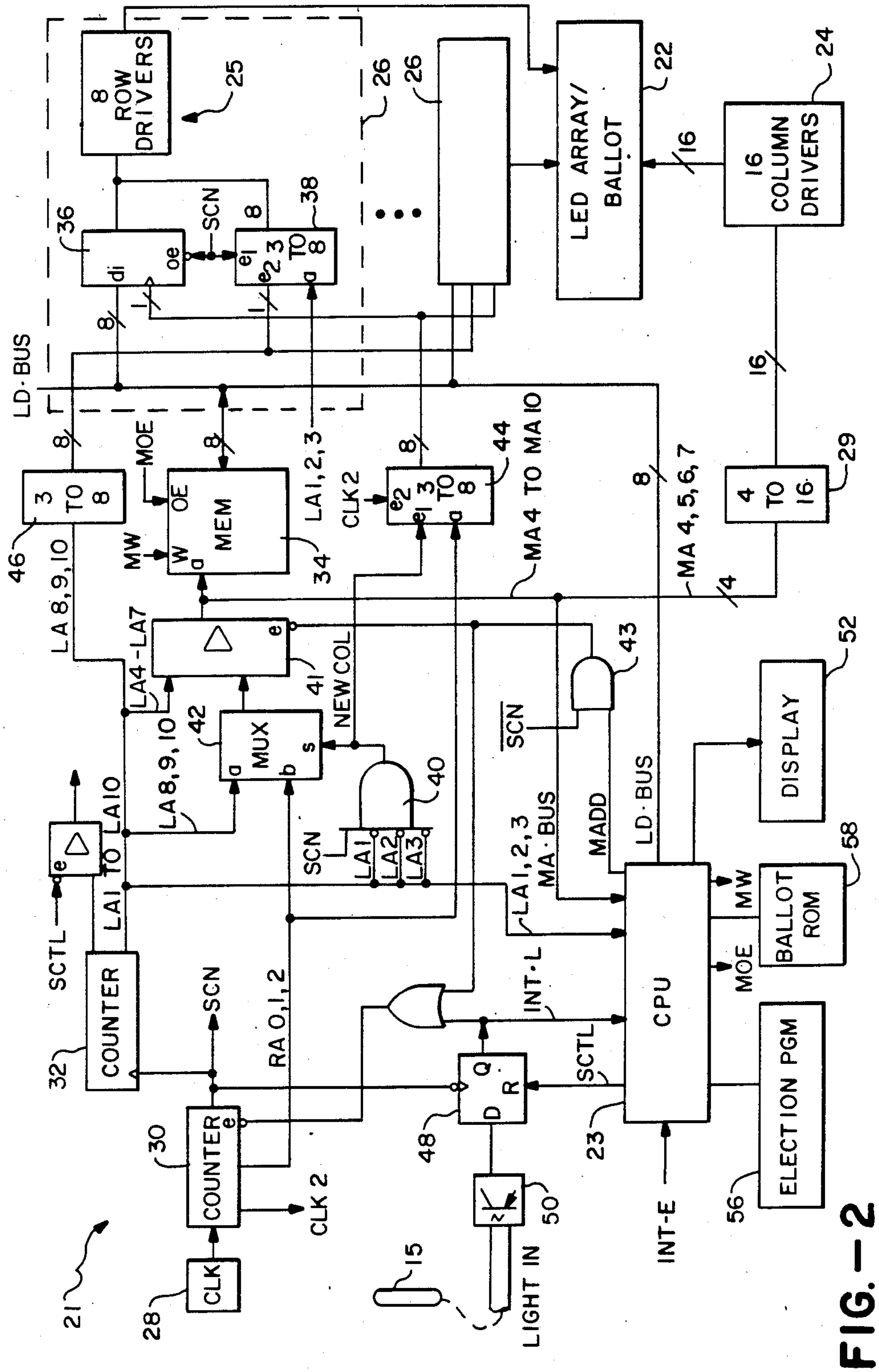
FIG. 2 depicts a block diagram of a preferred of the apparatus of the invention.

FIG. 8 depicts a timing diagram corresponding to certain of the signals shown in FIG. 2.

Figure 1:
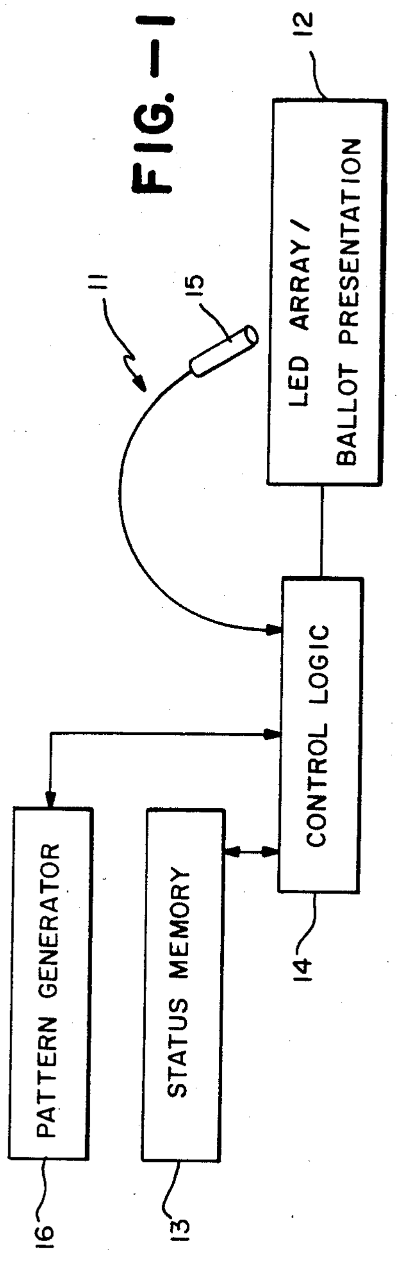
FIG. 1 depicts a block diagram of the basic apparatus invention.

Referring to FIG. 1, a system 11 in accordance with the invention includes a multiplicity of light emitting elements 12 such as light emitting diodes (LEDs), each of which are associated with a preidentified item. For example, each LED may be located next to a candidate's name on an electronic voting ballot. The system 11 further includes a status memory 13 for retaining a record of the items which have previously been selected. Control logic 14 uses this status memory 13 to determine which LEDs should be energized so as to produce visible light.

The control logic 14 is designed to time multiplex the use of the LEDs 12. The control logic 14 operates on a time cycle of somewhat variable length but which is sufficiently short that the human eye cannot perceive the workings of the system 11. In the preferred embodiment, each major cycle has a nominal duration of approximately 30 milliseconds and each subcycle has a approximately 3 duration of microseconds. For the purposes of this discussion, each "time cycle" corresponds to one of the preferred embodiment's subcycles.

Each time cycle is divided into two portions. In the preferred embodiment, the first portion comprises seven eighths of the time cycle and the second portion comprises one eighth of the time cycle. During at least the first portion of each time cycle, the control logic 14 energizes the LEDs in accordance with the status of the item corresponding to the LEDs, as recorded in the status memory 13. During the second portion of each time cycle the LEDs are energized in accordance with a time dependent pattern generated by a pattern generator 16.

An item is selected by placing a light pen 15 sufficiently close to the corresponding LED that light eliminating from the LED during the second portion of the time cycle is received by the pen 15. The position of the light pen 15 is determined by the control logic by correlating the time when light is received by the light pen 15 with the time dependent pattern generated by the pattern generator 16. For instance, in the preferred embodiment the pattern is that all the LEDs are successively energized, one at a time, one during each time cycle. Since only one LED is scanned during each time cycle (i.e., energized during the second portion of the time cycle), when the light pen 15 receives light during the second portion of a time cycle the selected item must be the item corresponding to the LED which was scanned during that time cycle.

As will be shown in greater detail below, in the preferred embodiment each LED is assigned a numerical position in accordance with the order in which the LEDs are scanned. This numerical position is also used for addressing the status memory 13.

In alternate embodiments, the pattern generator 16 could generate quite different patterns than the one dimensional pattern used in the preferred embodiment. A two dimensional pattern would involve dividing the LEDs into a set of groups, as though the LEDs were organized as a set of columns. The pattern would be to serially scan each group of LEDs, energizing one group during each (second portion of a) time cycle, at least until the light pen 15 receives light during the second portion of a time cycle. Then the pattern would be to serially scan all the LEDs in the selected group until the individual selected LED is found.

Other patterns, including binary search patterns and multidimensional search patterns could be used. In general, the pattern used is of little consequence as long as the duty cycle of each light caused by the scanning is small enough so as not to be noticeable to the user of the system 11.

Referring to FIG. 2, there is shown a system 21 for controlling up to 1023 LEDs 22 in accordance with the invention. For purposes of the immediate discussion, the LEDs 22 are assumed to be in an array of sixteen columns (labelled col 0 to col 15), with each column having 64 rows (except for the last column which cannot have more than 63 LEDs). Further, the 64 rows in each column are organized as eight sets of eight rows. However, as shown in FIG. 3, the lights in column 15 are not spatially organized as a linear column, but this has no effect on the function of the system 21 because regardless of how the lights are spatially organized, the lights in the column are electronically organized and accessed by the system as a linear set.

It should also be understood that FIG. 2 only shows the hardware for implementing the invention. Where the system 21 is designed using a microprocessor 23, the system 21 requires software (which is described below in some detail with reference to FIGS. 5, 6, and 7).

The LED array 22 is energized by means of two sets of drivers: sixteen column drivers 24 and sixty-four row drivers. The row drivers are organized into eight circuit groups 26. The column drivers selectively sink current while the row drivers selectively provide current. The LEDs in a particular column are energized by selecting the corresponding column driver and the row drivers corresponding to the LEDs which are to be turned on.

The various clocks and time signals needed for time multiplexing the use of the LEDs are derived from a clock 28 and two serially connected binary counters 30 and 32. The primary clock runs at a rate of about 4.6 MHz (about 217 nanoseconds per clock cycle). Each binary stage of the counters acts as a divide-by-two on the frequency of the preceding stage.

For purposes of this discussion, the faster changing binary stages will be called the low order (or least significant) bits or stages while the slower changing binary stages will be called the higher order (or most significant) bits or stages.

Further, each output signal from the two counters 30 and 32 is assigned a signal name as follows. The first counter 30 is a seven bit binary counter. The least significant bit is labelled CLK2. The next three least significant bits of counter 30 are labelled RA0, RAl and RA2, respectively. These latter signals are used for accessing the status memory, as will be explained below. Finally, the three most significant bits of counter 30 are logically AND'ed to produce the SCN signal, which is active one eighth of the time and is inactive the other seven eighths of the time.

As discussed below and as shown in the timing diagram of FIG. 8, the status memory 34 is accessed (at a fairly high speed) during the time when the SCN signal is active. Given a 4.6 MHz clock 28, the SCN signal normally oscillates of about 36 KHz (i.e., the basic clock rate divided by $2^7$) with a period of about 27.8 microseconds for each time cycle (wherein the SCN is active for about 4 microseconds and is inactive for about 23.8 microseconds). Further, since there can be as many as 1023 lights, it takes about 28.5 milliseconds (i.e., 1024 time cycles) to scan all the lights.

The SCN signal is used primarily to determine which of two sets of signals is to be used to address (i.e., control the energizing of) the LEDs. During the "scan" portion of each time cycle (when SCN is active) the signals derived from the second counter 32 control the energizing of the LEDs. During the "display" portion of each time cycle, LED status signals read from the memory 34 are used to control the energizing of the LEDs.

The SCN signal performs its primary role through the complementary activation of either latch 36 (which holds LED status information copied from memory 34) or decoder 38 (which helps decode the address signals generated by counter 32). Whenever the output drivers of the latch 36 are enabled the decoder 38 is not enabled, and vice versa.

The secondary role of the SCN signal is to bump the second (pattern generator) counter 32 (i.e., cause it to increment) and to initiate the sampling of the amount of light being received by the light pen 15.

The pattern generator counter 32 is a 10 stage binary counter which is incremented at the beginning of each scan period. Its output signals are labelled LAl to LA10 (LA stands for "Light Address"), where LA1 is the least significant bit and LA10 is the most significant.

The pattern generator counter 32 corresponds to the pattern generator 16 in FIG. 1. Each time it increments it generates a new test pattern (i.e., the energization of one LED). When the counter 32 reaches a value of 1023 (i.e., $1111111111_2$) a signal labelled Int.E is generated. This Int.E signal is used to interrupt the CPU 23 and to thereby cause it to execute a set of software instructions upon each complete scan of the LEDs. This set of software instructions is described below with reference to FIG. 6.

While in general the exact manner in which the ten counter signals LA1 to LA10 are used to address the LEDs is not important to the invention (because any number of schemes will work equally well), the preferred embodiment works as follows. Signals LA4 to LA7 are decoded by a (4 to 16) decoder 29 to determine which column of LEDs is addressed. During scanning, signals LA8 to LA10 are used as the high order row address for the LEDs (i.e., they determine which circuit group 26 is used) and signals LA1 to LA3 are used as the low order row address (i.e., they determine which one of the LED row drivers 25 within the circuit group 26 is energized). Thus the scan pattern is to scan all eight lights in the top leftmost column, then to scan the top eight lights in the next column, and so on across the columns; then to scan the second set of eight lights in the leftmost column; and so on.

Also during the first scanning subcycle for each column, the contents of the status memory 34 for that column of LEDs are loaded into the latches 36. The beginning of a new column in the scan pattern is characterized by LAl, LA2,LA3=0,0,0 (i.e., the low order row address bits are all zero). Further, the memory is organized as 128 bytes, each byte having eight status bits for a set of eight sequentially scanned LEDs from a single column.

Thus, during the first scanning subcycle for each column, a byte of memory is copied into a latch 36 during each CLK2 cycle. This works as follows. Since LA1,LA2,LA3=0,0,0 and SCN is active (see AND gate 40) the NewCol signal is activated and multiplexer 42 selects the "b" set of input signals. Thus RA0, RA1 and RA2 are used as the low order bits for addressing the status memory 34. The high order address bits for the memory 34 MA4 to MA7 are also used as the column address.

Buffer 41 is enabled at all times except when the CPU 23 is writing data into the memory 34. Therefore, except while data is being written into the memory, signals LA4 to LA7 are equivalent to signals MA4 to MA7. (Note that MA stands for "Memory Address".) The outputs of the buffer 41 are collectively called the MA.Bus. This bus can be read by the CPU 23 at any time and can be used to transmit an address from the CPU 23 to the memory 34 when the buffer 41 is disabled by the MADD signal.

The activated NewCol signal enables the operation of decoder 44 which uses the RA0, RA1 and RA2 signals to "address" and clock one of the eight latches 36. The clock causes the selected (or addressed) latch 36 to latch in whatever eight bits happen to be on the LD.Bus at the time. These eight bits are the eight bits read from the memory 34 using the memory address as described above.

As a matter of timing, it may be noted that the loading of the latches 36 from the memory 34 is a fairly fast operation due to the high frequency (about 2.3 MHz) of CLK2. That is, a new memory address (RA0,RA1,RA2) is generated approximately every 434 nanoseconds. Therefore the memory 34 must be reasonably fast. Any number of commercially available static 128 byte memories can be used.

Also it should be noted that the loading of the latches 36 occurs while the SCN signal is active. Since the SCN signal is used to enable and disable latches 36 and decoders 38, the outputs of the latches 36 are disabled while they are being loaded (as one would expect) and the decoders 38 are controlling the LEDs.

The scanning of the LEDs is a straightforward use of the LA1 to LA10 signals while SCN is active. It need only be noted that decoder 46 decodes the LA8, LA9 and LA10 signals to determine which row driver circuit group 26 is to be enabled, and that the decoder 38 (in each circuit group) decodes the LA1, LA2 and LA3 signals to select the individual LED (within the group of eight identified by the LA4 to LA10 signals).

While the lights are being energized in accordance with their status (i.e., when SCN is not active), the constantly changing values of RA0, RA1 and RA2 are of no consequence. Also, once the status information has been loaded from the memory 34 into the latches 36, no more information is read from the memory 34 into the latches 36 until the scan pattern moves on to a new column (i.e., after 8 time cycles).

New data is written into the status memory 34 by the CPU 23 as follows. As a preliminary matter, the writing of data into the memory 34 is generally initiated by an interrupt signal called Int.L. An Int.L signal is generated by flip flop 48 when light is received by photodiode 50 from the light pen 15 during the scan portion of a time cycle. In the preferred embodiment the photodiode 50 is a fiber optic receiver made by Hewlett Packard called a pin diode, which is essentially a high speed photodiode. Any other device capable of producing an electrical signal sufficiently quickly upon the receipt of light above a specified minimum intensity could be used in place of the photodiode.

The light pen 15 in the preferred embodiment is merely a fiber optic cable which has several feet of flexible cable and a relatively stiff four to five inch cylindrical casing on the end which gives the holder the feel of a standard pen. The unattached end of the pen 15 is used to select items on the ballot 22 by placing the pen sufficiently close to the item's corresponding LED to receive light therefrom during the scanning portion of the time cycle. The other end of the pen 15 is connected to a photodiode 50 which produces a voltage level signal corresponding to the amount of light received by the light pen 15. The output voltage level of the photodiode 50 is latched at the end of each scan period (i.e., upon the down transition of the SCN signal) by D flip flop 48.

In another embodiment the photodiode 50 could be at the unattached end of the pen 15 (where it would directly receive light without the aid of fiber optics) and the pen's cable would be an electrical cable (rather than a fiber optic cable) which would carry the photodiode 50 output signal to the flip flop 48. One advantage of the preferred embodiment over this alternate embodiment is that the preferred pen is more durable (i.e., immune to the wear and tear of normal use) because the photodiode 50 is protected from damage.

Upon the generation of an Int.L signal (at the end of a scan subcycle) the first counter 30 is disabled and the CPU 23 is interrupted. By disabling the counter 30 the SCN signal is temporarily latched in an inactive state and therefore the second counter 32 is also frozen. Further, an Int.L signal causes the CPU 23 to perform a set of software instructions which are used every time an Int.L interrupt occurs. These software instructions (which are discussed in more detail below with reference to FIG. 7) determine which LED has been selected and whether the status of the selected LED should be changed.

The CPU 23 determines which LED (and therefore which corresponding item) has been selected by observing the value of LA1 to LA10 (actually LA1 to LA3 and MA4 to MA10) at the time of the interrupt. In essence, the LA1 to LA10 signals are the address of the LED which was last scanned (i.e., energized during the scan portion of the current time cycle). In the preferred embodiment, the system 21 then performs two levels of analysis: (1) first it determines if the light pen has been pointed at the selected item sufficiently long and in such a context that some further action is required; and (2) if so, it performs certain data processing steps. For instance, since all the items in the preferred embodiment are scanned approximately every 30 milliseconds, the system 21 could require that an item be selected in three consecutive time cycles before going on to the data processing step. In the data processing step the system 21 could determine if the selected item is a legal entry (e.g., whether the user has tried to vote for two persons for a single office).

Further, legal entries can be verified by displaying information about the user's selection on a display 52 (whereupon the user can take remedial action, as described below, if he is dissatisfied with his selection); and "illegal entries" can be noticed with a proper error message on the display 52.

In the preferred embodiment, the display 52 is a four line, 40 character per line, LCD (liquid crystal display) display device.

If the CPU 23 determines (as part of its data processing initiated by the Int.L signal) that the status of the selected light should be changed, the status memory 34 is updated as follows. First, it should be noted that immediately after the Int.L signal, the address of the light and the byte of memory data on the LD.Bus are read by the CPU 23, and the first counter 30 is re-enabled by a SCTL (Scan ConTroL) signal generated by the CPU 23. As long as the SCTL signal is active it disables the generation of any further interrupt signals, such as Int.L, by the control logic. The SCTL signal is removed by the CPU 23 when it finishes with the data processing initiated by the Int.L signal.

From the value of the LA1 to LA3 and MA4 to MA10 signals the CPU 23 determines which individual light was selected. It can then modify the corresponding bit of the memory byte which was just read from the LD.Bus. When the CPU 23 needs to write to the memory 34, it must stop the scan counter 23 and temporarily take control of the MA.Bus by issuing a MADD signal, which disables counter 30 and buffer 41 when SCN is inactive. Then it puts the correct memory address for the selected light (and the seven other lights in its group) on the MA.Bus. Finally, the modified byte is stored back in the status memory 34 by (1) disabling the memory output by disabling the MOE signal (thereby freeing the LD.Bus for use by the CPU 23); placing the modified data byte on the LD.Bus and thereby transmitting the information to the data input port of the memory 34; and (3) activating the MW (i.e., memory write) signal which causes the memory 34 to read the data on the LD.Bus into the memory address location specified by LA4 to LA10. After all this is done, the MW, MADD and MOE signals are returned to their normal status and the system 21 resumes normal operation.

An important aspect of the preferred embodiment is the extremely simple architecture of the circuitry used to multiplex the use of the LEDs between display and data entry functions. This simplicity enables the production of systems at very low cost and facilitates system reliability.

The reason that the lights energized during the scan portion of the time cycles are not visible and that the lights energized in accordance with their status are visible by the human eye in a normal ambient light environment is primarily a function of (1) the duty cycle with which the lights are energized and (2) the persistence of the eye. In particular, a simple calculation will show that in the above described preferred embodiment lights with an on status will be energized about 5.5% of the time and that lights being scanned are energized about 0.01% of the time. Further the LEDs are energized with 60 ma of current, close to the peak current allowed, but with an average current well below the maximum average current of 20 ma. Thus the LEDs are energized with sufficient that they produce light which is detectable by the light detection element (e.g., a photodiode) during the 4 microsecond scan portion of a time cycle; but such a 4 microsecond pulse of light is not visible to the human eye in a normal ambient light environment. On the other hand, in a dark or fairly dark room even the 0.01% scan duty cycle is visible to the human eye. Therefore, if the invention is to be used in a fairly dark environment, the duty cycle of the scan portion of the time cycle would have to be even further reduced in order to reduce the visibility of the light generated by the scanning of the lights. Since LEDs produce light virtually instantaneously upon the flow of current through the diode, the shortness of the scan portion of each time cycle is limited only by the speed of the LED drivers and light detection apparatus and should be easily reduced to about 1 microsecond (and thus about a 0.003% duty cycle in the preferred embodiment) while standard TTL MSI circuitry.

As for the duty cycle of the LEDs with an on status, this also clearly adjustable, for instance by reducing the number of columns. Given the well documented persistence of the human eye, however, the 5.5% duty cycle used in the preferred embodiment quite sufficient, especially when the flicker rate of each LED with an on status is appreciably faster than 60 Hz (the flicker rate of standard commercial televisions used in the United States). The type of fast flickering used in the preferred embodiment (at a rate of about 280 Hz) is well beyond the sensitivity of the human eye.

As indicated above, the length of each scan period is somewhat variable. This is caused by the somewhat variable amount of time used by the CPU 23 while running the software for processing each interrupt signal, such as Int.E, during which time the scan clock (and thus the SCN signal) is frozen.

Another aspect of the invention, when used as an electronic voting apparatus, is the tallying of votes. Since the electronic tallying of votes, and various methods of producing backup records of individual votes, are well known in the prior art and well within the skill of one of ordinary skill designing such a system, this aspect of the system needs little discussion other than to note that such a facility must be included. Often, a vote tallying mechanism will also include means (usually including a standard modem) for transmitting the results of the tallying to a central data processing facility.

Given the basic hardware described with reference to FIGS. 1, 2 and 8, a large number of different systems can be implemented. The differences in the systems will be a function firstly of the particular layout of the lights and the corresponding items, and secondly of the software used to interpret the light signals received by the pen. These aspects of the invention will now be addressed.

Referring to FIG. 3, one preferred embodiment of the invention includes the use of a single page ballot, as is generally used, for instance, in New York State elections. The ballot is divided into 16 columns, labelled Col 0 to Col 15 in the drawing. each column (except Col 15) contains 64 LEDs, only the LEDs corresponding to items on the ballot can be selected by the user. An attempt to select any other LED will cause the display of an error message on the display 52.

As described above, when a proper item is selected, the name of the candidate or other information regarding the selected item is displayed on the LCD display 52.

Another aspect of the invention which is shown in FIG. 3 is the provision of a write in keyboard 62 which operates using the same mechanism as described above for the other lights. When the user wishes to vote for a candidate not on the ballot, he can select the "write in" item (for example see the write in item in Col 0) by placing the light pen 15 near the corresponding light. The system 21 will then display a message on the display 52 explaining to the user that he should use the keyboard to write in the name of the candidate he would like to vote for.

The keyboard 62 is used by placing the light pen 15 next to each letter (or punctuation mark) as needed. The selected letters are echoed on the display 52 for verification by the user. Mistakes can be corrected by using the "BACKSPACE" item on the keyboard, which erases one letter at a time by backspacing over the previously selected letters.

In the preferred embodiment, when a letter is selected the corresponding light remains lit for approximately two seconds and is then extinguished. This latter function is easily implemented through software (for example, the software which runs after the Int.E interrupt signal could keep track of the amount of time which has passed since the letter was selected).

When the user is done voting he indicates this by selecting the appropriately labelled item, as shown in the lower righthand portion of the keyboard 62.

Another potential use of the write in keyboard 62 is the manual entry of data to define the parameters of the election. This would take the place of a predefined set of election data, as might be supplied in a read only memory ROM 58, for use in conjunction with a standard election program 56 designed to handle a wide variety of election rules and formats for many jurisdictions.

An alternate format for a ballot is shown in FIGS. **4*a* and 4*b***, which is similar to format of the "Votamatic TM" machines used in California and other jurisdictions. Each page contains a variety of items, such as the candidates for one or more offices. As each page is turned, a new set of lights is uncovered. Thus each page has a corresponding set of lights. Further, the last page can be used as a write in keyboard, with one row of lights for the alphabet and a second row of lights for punctuation marks and so on.

Naturally any number of ballot formats can be used within the scope of the invention and the embodiments shown in FIGS. 3 and **4*a–b*** are merely exemplary.

Method of the Invention

Referring to FIG. 5, the method of the is a method of selecting one of a multiplicity of preidentified items, where each item has an associated light emitting element which has an on/off status. The method involves time multiplexing the use of the lights between display and data collection tasks.

For at least a first certain portion of each of a plurality of successive time cycles, the lights with an on status, which are associated with previously selected items, are energized to a level of illumination visible to the human eye in a normal ambient light environment (see box 74).

For a second portion of each of the time cycles, the lights are scanned (i.e., selectively energized) in a prearranged time dependent algorithmic pattern to a level of illumination not normally visible to the human eye in a normal ambient light environment (see box 71).

If light is detected (usually because one of the items was selected by positioning a light detection element sufficiently close to the item's associated light to receive the light emitted therefrom during at least one of the second portions of said time cycles) (see decision box 72) then the selection is processed (see box 73). If no light is detected after the scanning step then the process recycles back to the status display step (box 74).

The primary step in processing a selection is determining which one of the items is selected by correlating the time when light is received by the light detection element with the prearranged time dependent pattern.

The secondary step in processing a selection is determining if the pattern of light received (generally over a period of numerous time cycles) indicates that the selected item needs further processing, as discussed below with reference to FIG. 7.

The last step in processing a selection is information processing. In an election voting system, this generally involves the use of an election program 56 (see FIG. 2) to compare the user's selections with data (stored, for example, in a read only memory ROM 58) regarding the rules of the election.

Referring to FIGS. 6 and 7, two software routines are used to provide a proper "tactile" response to the user of the light pen 15. These routines are based on several practical considerations. First, light from sources other than the LEDs on the ballot can enter the light pen 15. Therefore the system must be able to ensure that items are not selected inadvertently due to light received from such outside sources.

Second, the system must allow the user to erase (i.e., de-select) previous selections. Since only a single light is used with each item, there are only a few user-friendly ways to do this. In the preferred embodiment, items are de-selected by pointing the light pen at the selected item's light a second time, but only after the user "lifts" the pen away from the light.

Third, the system handles potentially conflicting item selections in successive time cycles by forcing selections to be made consecutively for at least a specified number of cycles (see the discussion below for a more detailed explanation); i.e., by forcing the user to hold the pen 15 over the light long enough to ensure that the selection is deliberate.

Fourth, the system uses the concepts of "pen up" and "pen down" to help clarify potentially conflicting item selections. A pen down condition is established when an item is selected in a preselected number X of "consecutive" "scan cycles". A pen down condition has associated with it a selected item or light. It should be noted that the term "scan cycle" is being used here to mean the process of (or the period of time for) a full scan of all the LEDs in the array 22. Also, the term "consecutive scan cycles" is used loosely, as will be understood from a close inspection of the flowcharts in FIGS. 6 and 7. Generally, two scan cycles wherein a particular item is selected are considered to be "consecutive" even if there are a number (less than Z) of intervening scan cycles in which no item has been selected. This helps cover the case where the user's hand is shaky, but is generally holding the light pen 15 over a single LED.

A pen up condition is established if no items are selected for a preselected number Z of scan cycles. However, a pen up condition is also established if, after a pen down condition is established, a new light (different from the light associated with the pen down condition) is selected for a preselected number Y of consecutive scan cycles.

Referring to FIG. 6, there is shown the routine which is executed each time all the lights have been scanned (i.e., the second counter 32 reaches a value of 1023). The CPU starts running this routine when an Int.E signal is generated. The purpose of this routine is to establish a pen up condition if no selections are made for Z consecutive scan cycles.

At the beginning of each scan cycle a special flag in the CPU 23 is cleared. This flag is set if any items have been selected (see decision box 75) during the last scan cycle, in which case this routine immediately exits (box 81). Also, even if no items were selected in the last period, if the pen condition is already up the routine immediately exits.

If, however, the pen condition is down and no selections were made during the previous scan cycle, then the routine tests $CNT_y$ to determine if no selections have been made in the previous Z consecutive scan cycles (box 77). $CNT_y$ corresponds to the number of scan cycles in which no selections are "read". If so, the pen condition is set to "pen up" (box 78) and $CNT_y$ is cleared (box 79) before the routine exits. Otherwise $CNT_y$ is incremented.

Referring to FIG. 7, there is shown the routine for establishing a pen down condition. The routine is executed whenever an Int.L signal is generated, i.e., whenever the light pen 15 receives light during the scan portion of a time cycle. For example, this routine will be run after practically every time cycle if the pen 15 is pointed at a bright light. "Practically", because the running of this routine can be initiated only when the SCTL signal is turned off after the previous run of the routine. Since, in the preferred embodiment, the routine takes two to three time cycles to run, and the SCN clock is re-enabled near the beginning of the routine, this routine can run only every second or third time cycle.

As explained above with reference to FIG. 2, the first operation (see box 96) upon the occurence of an Int.L signal is for the CPU 23 to read in the LED position (LA1 to LA3 and MA4 to MA10), read in the memory byte on the LD.Bus, and to turn on the SCTL (Scan ConTroL) signal. The SCTL signal re-enables the scan counter 30 and prevents the generation of any further interrupt signals. Thus the system 21 continues normal status display operation while the CPU 23 performs its data processing task.

The CPU task performed depends on whether the current selection is the same as the previous selection (box 82). If so, and the pen condition is already down (box 83) then $CNT_y$ is reset (box 84) and the routine exits (boxes 97 and 98). Resetting $CNT_y$ merely nullifies the effect of any intervening scan cycles in which no selections were made (see discussion of the routine shown in FIG. 6). If the pen condition is up, then $CNT_x$ is tested (box 86) to determine if the same selection has been made in the previous X scan cycles (disregarding any scan cycles in which no selections mere made, for instance because the user's hand was shaking). If not, $CNT_x$ is incremented (box 87) and the routine exits. Otherwise a pen down condition is established (box 88) and the selection is forwarded for further processing by the CPU (box 89). For instance, the status of the selected light might be changed and information regarding the selection might be shown on the display 52.

Finally the SCTL signal is turned off (box 97) and the routine exits (box 98).

If the selection is not the same of the previous selection (box 82) and the pen condition is up (box 91) then the LED position is updated to be equal to the position of the current selection (box 92), $CNT_x$ is cleared, and the routine exits. If the pen condition is down the value of $CNT_y$ is tested (box 93). If $CNT_y$ equals Y then the pen condition is set to up (box 94) because the pen has been away from the last established selection for a sufficiently long time to indicate that it is no longer being selected by the user. Then $CNT_y$ is cleared, the LED position is updated to be equal to the position of the current selection (box 92), $CNT_x$ is cleared, and the routine exits. Finally, if $CNT_y$ is not yet equal to Y then $CNT_y$ is incremented (box 95) and the routine exits (box 85).

In practice, the above routine results in the following "tactile" characteristics. Given a scan cycle of around 30 milliseconds (including post scan cycle information processing) and a value of $X=3$, the pen 15 must be next to a light for about 0.098 seconds before that selection is processed by the system. If one's hand is shaking so that light is not detected for one or two scan cycles, the selection is delayed by that much, but nevertheless the selection is made. If one quickly moves the pen from one selection to another, a pen up condition must be established before a new selection can be made. Therefore it may take 0.2 or 0.3 seconds before the new selection is made. Also, an item can not be selected twice in succession without a pen up condition being established in between. Therefore (since items are both selected and de-selected by putting the pen next to the item's light) an item will not be cyclically selected and, de-selected by leaving the pen next to an item, because after the item is selected the pen must be moved away from the item temporarily before the item can be de-selected.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a method of selecting one of a multiplicity of preidentified items, having associated therewith a light emitting element, the steps comprising:

(a) providing memory means for storing an on/off status for each said item and its associated light;

(b) in an continuing sequence of time cycles, each time cycle having first and second nonoverlapping portions, energizing said lights by energizing, during said first portion of each time cycle, the lights having an on status stored in said memory means to a level of illumination visible ot the human eye in a normal ambient light environment;

energizing, during said second portion of each time cycle, a multiplicity of said lights in a prearranged time dependent pattern to a level of illumination not normally visible to the human eye ina normal ambient light environment;

(c) selecting one of said items by positioning a light detection element sufficiently close to said item's associated light to receive the light emitted therefrom during said second portion of at least one of said time cycles; and (d) determing which one of said itmes is selected by correlating the time when light is received by said light detection element with said prearranged time dependent pattern.

2. In the method of claim 1, the further step of:

(e) changing the status of the light associated with the selected item when the pattern of light received therefrom satisfies a predefined detection algorithm.

3. In the method of claim 2, said changing step including the step of:

latching the status of said selected item so that said status is not changed twice in succession unless said light detection element does not receive the light emitted therefrom during said second portion of said time cycles for at least a preselected number of successive time cycles.

4. In the method of claim 1, said prearranged time dependent pattern comprising a prearranged serial sequence of energizing single lights in separate time slots.

5. In the method of claim 4, said prearranged time dependent pattern further comprising the energizing of one selected light during the second portion of each time cycle, whereby a multiplicity of time cycles are required to scan the full set of lights.

6. In the method of claim 1, said prearranged time dependent pattern comprising a two-dimensional pattern of rows and columns wherein each of either said rows or said columns of lights are serially energized at least until said light detection element receives light emitted from one of said lights during at least one of said second portions of said time cycles.

7. In the method of claim 1, the step of:

upon the selection of an item, providing textual confirmation on on a display device of the item.

8. In the method of claim 7, the step of:

upon the selection of an item which in accordance with predefined criteria is an illegal selection, providing textural explanation on a display device that an error has been detected.

9. In the method of claim 1, the steps of:

providing a plurality of keyboard items with associated lights, said items comprising at least a partial keyboard menu;

enabling the use of said keyboard items in response to the selection of one a predefined set of write in items;

after the keyboard items are enabled, responding to the selection of one or mroe keyboard items by echoing the selected keyboard itmes on a display device.

10. The method of claim 1, said selecting and determining steps including the steps of:

establishing a pen up condition when said light detection element does not receive light emitted from any of said lights during said second portion of a first preselected number of successive time cycles;

establishing a pen down condition and selection one of said items and its associated light when said light detection element receives light emitted from the same light during said second portion of a second preselected number of time cycles, no two of which are interrupted by a time cycle in which said light detection element receives light from another light during said second portion of said time cycle; and changing the status of the item and light selected by establishing a pen down condition, and storing said changed status in said memory means;

wherein the status of a selected item and its associated light can be changed only by the steps of first establishing a pen up condition and then establishing a pen down condition to select said item and light.

11. In a system for selecting one of a multiplicity of preidentified items, each item having associated therewith a light emitting element:

status memory means for storing an on/off status for each said item and its associated light;

pattern generating means for controlling the order in which a multiplicity of said lights are energized in a prearranged time dependent pattern;

a light detection element; and control logic means for time multiplexing the use of said lights in an continuing sequence of time cycles, each time cvcle having first and second nonoverlapping portions, including means for energizing the lights with an on status, in accordance with said status memory means, during said first portion of each time cycle, to a level of illumination visible to the human eye in a normal ambient light environment; and means for energizing the lights in said prearranged time dependent pattern, as controlled by said pattern generating means, during said second portion of each time cycle, to a level of illumination not normally visible to the human eye in a normal ambient light environment; and means for determining which one of said items is selected by correlating the time when light is received by said light detect with said prearranged time dependent pattern.

12. In the system of claim 11, said logic control means including:

means for changing the status of the light associated with the selected item when the pattern of light received therefrom satisfies a predefined detection algorithm, including means for updating said status table in said status memory means.

13. In the system of claim 12, said logic control means including:

latching means for preventing the status of any of said lights from being changed twice in succession unless said light detection element does not receive the light emitted therefrom during said second portion of said time cycles for at least a preselected number of successive time cycles.

14. In the system of claim 13, said prearranged time dependent pattern comprising a prearranged serial sequence of energizing single lights in separate time slots.

15. In the system of claim 14, said prearranged time dependent pattern further comprising the energizing of one selected light during the second portion of each time cycle, whereby a multiplicity of time cycles are required to scan the full set of lights.

16. In the system of claim 13, said prearranged time dependent pattern comprising a two-dimensional pattern of rows and columns wherein each of either said rows of said columns of lights are serially energized at least until said light detection element receives light emitted from one of said lights during at least one of said second portions of said time cycles.

17. In the system of claim 13:

display means for providing, upon the selection of an item, textual confirmation of the item.

18. In the system of claim 17:

means for providing, upon the selection of an item which in accordance with predefined criteria is an illegal selection, a textual explanation, on said display device that an error has been detected.

19. In the system of claim 18:

keyboard means including a plurality of keyboard items with associated lights, said items comprising at least a partial keyboard menu;

means in said control logic means enabling the use of said keyboard items in response to the selection of one a predefined set of write in items; and means in said control logic means for responding, after the keyboard items are enabled, to the selection one a predefined set of write in items; and means in said control logic means for responding, after the keyboard items are enabled, to the selection of one or more keyboard items by echoing the selected keyboard items on said display means.

20. In the system of claim 10, said logic control means including data processing means for:

establishing a pen up condition when said light detection element does not receive light emitted from any of said lights during said second portion of a first preselected number of successive time cycles;

establishing a pen down condition and selecting one of said items and its associated light when said light detection element receives light emitted from the same light during said second portion of a second preselected number of time cycles, no two of which are interrupted by a time cycle in which said light detection element receives light from another light during said second portion of said time cycle; and changing the status of the item and light selected by establishing a pen down condition, and storing said changed status in said status memory means;

wherein the status of a selected item and its associated light can be changed only by the steps of first establishing a pen up condition, and storing said changed status in said status memory means;

wherein the status of a selected item an its associated light can be changed only by the steps of first establishing a pen up condition and then establishing a pen down to select said item and light.

21. In an electronic voting system for selecting at least one of a multiplicity of preidentified items; said items being divided into groups from each of which only a corresponding predefined number of items can be selected; each item having associated therewith a light emitting element; apparatus comprising:

status memory means for retaining a status table which indicates which of said items have previously been selected;

pattern generating means for controlling the order in which a multiplicity of said lights are energized in a prearranged time dependent pattern;

a light detection element; and control logic means for time multiplexing the use of said lights in an continuing sequence of time cycles, each time cycle having first and second nonoverlapping portions, including means for energizing the lights with an on status, in accordance with said status memory means, during said first portion of each time cycle, to a level of illumination visible to the human eye in a normal ambient light environment;

means for energizing the lights in said prearranged time dependent pattern, as controlled by said pattern generating means, during said second portion of each time cycle, to a level of illumination not normally visible to the human eye in a normal ambient light environment;

means for determining which one of said items is selected by correlating the time when light is received by said light detection element with said prearranged time dependent pattern; and means for changing the status of the light associated with the selected item when the pattern of light received therefrom satisfies a predefined detection algorithm, including means for updating said status table in said status memory means;

said means for changing including ballot format means for defining how said items are allocated into groups and for defining the number of items which can be selected from each said group;

selection verification means for verifying that a newly selected item conforms to the pattern defined by said ballot format means; and error notification means for warning the user of said system when a selected item is found by said selection verification means not to conform to the pattern defined by said ballot format means.

22. In the system of claim 21:

display means for displaying textual information;

keyboard means including a plurality of keyboard items with associated lights, said items comprising at least a partial keyboard menu;

means in said control logic means enabling the use of said keyboard items in response to the selection of one a predefined set of write in items; and means in said control logic means for responding, after the keyboard items are enabled, to the selection of one or more keyboard items by echoing the selected keyboard items on said display means.

23. In the method of claim 10, said changing step occurring only when a pen down condition is first established, thereby preventing the status of an item from being changed twice in succession unless a pen up condition is established between said successive status changing steps.

24. In the method of claim 10, said first and second preselected numbers both having values greater than one.

25. In the method of claim 10, re-establishing a pen up condition after establishing a pen down condition when said light detection element receives light emitted from a light other than said selected light during said second portion of a third preselected number of time cycles.

26. In the method of claim 25, said first, second and third preselected numbers all having values greater than one.

27. In the system of claim 20, said data processing means changes the status of a selected item ony when a pen down condition is first established, thereby preventing the status of an item from being changed twice in succession unless a pen up condition is established between said successive status chamges.

28. In the system of claim 20, said first and second preseleced numbers both having values greater than one.

29. In the system of claim 20, said logic control means including data processing means for:

re-establishing a pen up condition after establishing a pen down condition when said light detection element receives light emitted from a light other than said selected light during said second portion of a third preselected number of time cycles.

30. In the method of claim 1, energizing said lights so that said lights having a non status appear to the human eye to be on continuously.

31. In the system of claim 11, said means for energizing the lights with an on status including means for energizing said lights so that said lights with an on status appear to the human eye to be on continuously.

* * * * *